(12) United States Patent
Takahashi et al.

(10) Patent No.: US 10,253,276 B2
(45) Date of Patent: Apr. 9, 2019

(54) REFRIGERATING-MACHINE OIL AND WORKING-FLUID COMPOSITION FOR REFRIGERATING MACHINE

(71) Applicant: JXTG Nippon Oil & Energy Corporation, Tokyo (JP)

(72) Inventors: Hitoshi Takahashi, Tokyo (JP); Tsutomu Takahashi, Tokyo (JP); Souichirou Konno, Tokyo (JP)

(73) Assignee: JXTG NIPPON OIL & ENERGY CORPORATION, Tokyo (JP)

( * ) Notice: Subject to any disclaimer, the term of this patent is extended or adjusted under 35 U.S.C. 154(b) by 0 days.

(21) Appl. No.: 15/305,568

(22) PCT Filed: Mar. 23, 2015

(86) PCT No.: PCT/JP2015/058738
§ 371 (c)(1),
(2) Date: Oct. 20, 2016

(87) PCT Pub. No.: WO2015/163071
PCT Pub. Date: Oct. 29, 2015

(65) Prior Publication Data
US 2017/0044462 A1    Feb. 16, 2017

(30) Foreign Application Priority Data

Apr. 23, 2014 (JP) ................. 2014-089615

(51) Int. Cl.
| C09K 5/04 | (2006.01) |
| C10M 171/00 | (2006.01) |
| C10M 101/02 | (2006.01) |
| C10M 105/06 | (2006.01) |
| C10M 137/10 | (2006.01) |
| C10M 169/04 | (2006.01) |

(52) U.S. Cl.
CPC ......... *C10M 171/008* (2013.01); *C09K 5/044* (2013.01); *C10M 101/02* (2013.01); *C10M 105/06* (2013.01); *C10M 137/105* (2013.01); *C10M 169/04* (2013.01); *C09K 5/04* (2013.01); *C09K 2205/126* (2013.01); *C10M 2203/065* (2013.01); *C10M 2203/1006* (2013.01); *C10M 2203/1065* (2013.01); *C10M 2207/023* (2013.01); *C10M 2207/026* (2013.01); *C10M 2207/042* (2013.01); *C10M 2207/24* (2013.01); *C10M 2223/041* (2013.01); *C10M 2223/047* (2013.01); *C10N 2220/301* (2013.01); *C10N 2230/02* (2013.01); *C10N 2240/30* (2013.01)

(58) Field of Classification Search
CPC ............ C09K 5/044; C09K 2205/126; C10M 101/02; C10M 105/04; C10M 2203/0206; C10M 2203/1025
See application file for complete search history.

(56) References Cited

U.S. PATENT DOCUMENTS

| 6,736,991 | B1 * | 5/2004 | Cohen ................... | C09K 5/045 252/68 |
| 8,454,853 | B2 * | 6/2013 | Van Horn .............. | C09K 5/044 252/68 |
| 2009/0305876 | A1 * | 12/2009 | Singh ...................... | C08J 9/144 502/150 |
| 2011/0001080 | A1 * | 1/2011 | Van Horn .............. | C09K 5/044 252/68 |
| 2011/0012052 | A1 * | 1/2011 | Van Horn .............. | C09K 5/044 252/68 |
| 2011/0230685 | A1 * | 9/2011 | Tagawa .................. | C10G 45/58 585/1 |
| 2012/0122996 | A1 * | 5/2012 | Basu ........................ | C09K 3/30 514/772 |
| 2015/0152749 | A1 * | 6/2015 | Nishiguchi ............ | C09K 5/045 60/651 |
| 2016/0178254 | A1 * | 6/2016 | Nishiguchi ............ | C09K 5/044 62/115 |

FOREIGN PATENT DOCUMENTS

| JP | 2010-531926 A | 9/2010 |
| JP | 2013-506731 A | 2/2013 |
| JP | 2013-249326 A | 12/2013 |
| WO | WO 2009/114397 A2 | 9/2009 |
| WO | WO 2010/077898 A2 | 7/2010 |
| WO | WO 2011/041286 A2 | 4/2011 |
| WO | WO 2015/022959 A1 | 2/2015 |

OTHER PUBLICATIONS

International Bureau of WIPO, International Preliminary Report on Patentability in International Application No. PCT/JP2015/058738, along with English language translation of the Written Opinion; 7 pp. (dated Nov. 3, 2016).

Japanese Patent Office, International Search Report in International Application No. PCT/JP2015/058738, 2 pp. (dated Apr. 14, 2015).

\* cited by examiner

*Primary Examiner* — John R Hardee

(74) *Attorney, Agent, or Firm* — Leydig, Voit & Mayer, Ltd.

(57) ABSTRACT

The invention provides a refrigerating machine oil comprising a hydrocarbon-based base oil, the refrigerating machine oil having a viscosity index of 120 or less, and being used with a 1-chloro-3,3,3-trifluoropropene refrigerant.

8 Claims, No Drawings

REFRIGERATING-MACHINE OIL AND WORKING-FLUID COMPOSITION FOR REFRIGERATING MACHINE

CROSS-REFERENCE TO RELATED APPLICATIONS

This patent application is the U.S. national phase of International Application No. PCT/JP2015/058738, filed on Mar. 23, 2015, which claims the benefit of Japanese Patent Application No. 2014-089615, filed Apr. 23, 2014, the disclosures of which are incorporated herein by reference in their entireties for all purposes.

TECHNICAL FIELD

The present invention relates to a refrigerating machine oil, and a working fluid composition for a refrigerating machine; use of a composition containing a hydrocarbon-based base oil for a refrigerating machine oil or a working fluid composition for a refrigerating machine; and use of a composition containing a hydrocarbon-based base oil for manufacturing a refrigerating machine oil or a working fluid composition for a refrigerating machine.

BACKGROUND ART

CFC (chlorofluorocarbon) and HCFC (hydrochloro-fluoro-carbon), which have been heretofore used as a refrigerant for refrigerating equipment, are now subject to regulation from the recent fear of ozone layer destruction, and alternatively HFC (hydrofluorocarbon) has come to be used as a refrigerant. However, among HFC refrigerants, HFC-134a, which has been used for a car air-conditioner refrigerant like a standard material, is also subject to regulation in Europe, because its global warming potential (GWP) is high, despite its zero ozone depletion potential (ODP).

Under such circumstances, there is an urgent need to develop a refrigerant that has little influence on the ozone layer and exhibits low GWP. For example, Patent Literature 1 discloses a trans-1-chloro-3,3,3-trifluoropropene (1233zd (E)) refrigerant as a refrigerant having low ODP and GWP.

In the case of a conventional refrigerant such as CFC and HCFC, a hydrocarbon oil, such as a mineral oil and an alkylbenzene, has been used favorably as a refrigerating machine oil, however, since a refrigerating machine oil may exhibit, depending on the kind of a coexisting refrigerant, an unexpected behavior in terms of compatibility with a refrigerant, lubricity, viscosity of a solution with a refrigerant, and thermal and chemical stability, development of a refrigerating machine oil for each refrigerant becomes necessary.

CITATION LIST

Patent Literature

Patent Literature 1: International Publication No. WO 2010/077898

SUMMARY OF INVENTION

Technical Problem

An object of the present invention is to provide a refrigerating machine oil superior in suitability with a 1-chloro-3,3,3-trifluoropropene (1233 zd) refrigerant, and a working fluid composition for a refrigerating machine containing the refrigerating machine oil.

Solution to Problem

The present invention provides a refrigerating machine oil containing a hydrocarbon-based base oil, having a viscosity index of 120 or less, and used with a 1-chloro-3,3,3-trifluoropropene refrigerant.

The present invention provides a working fluid composition for a refrigerating machine comprising a refrigerating machine oil containing a hydrocarbon-based base oil, having a viscosity index of 120 or less, and a 1-chloro-3,3,3-trifluoropropene refrigerant.

It is preferable that the hydrocarbon-based base oil have a viscosity index of 120 or less.

The hydrocarbon-based base oil has preferably % $C_N$ of 10 to 75.

It is preferable that the 1-chloro-3,3,3-trifluoropropene refrigerant be a trans-1-chloro-3,3,3-trifluoropropene refrigerant.

It may also be deemed that the present invention is a use of a composition containing a hydrocarbon-based base oil for a refrigerating machine oil or a working fluid composition for a refrigerating machine, wherein the composition has a viscosity index of 120 or less, the refrigerating machine oil is used with a 1-chloro-3,3,3-trifluoropropene refrigerant, and the working fluid composition for a refrigerating machine contains the refrigerating machine oil and the 1-chloro-3,3,3-trifluoropropene refrigerant.

Further, it may also be deemed that the present invention is a use of a composition containing a hydrocarbon-based base oil for manufacturing a refrigerating machine oil or a working fluid composition for a refrigerating machine, wherein the composition has a viscosity index of 120 or less, the refrigerating machine oil is used with a 1-chloro-3,3,3-trifluoropropene refrigerant, and the working fluid composition for a refrigerating machine contains the refrigerating machine oil and the 1-chloro-3,3,3-trifluoropropene refrigerant.

Advantageous Effects of Invention

According to the present invention, a refrigerating machine oil superior in suitability with a 1-chloro-3,3,3-trifluoropropene (1233 zd) refrigerant, and a working fluid composition for a refrigerating machine containing the refrigerating machine oil can be provided.

DESCRIPTION OF EMBODIMENTS

Preferred embodiments of the present invention will be described below in detail.

A refrigerating machine oil according to the present embodiment comprises a hydrocarbon-based base oil, has a viscosity index of 120 or less, and is used with a 1-chloro-3,3,3-trifluoropropene refrigerant.

A working fluid composition for a refrigerating machine according to the present embodiment comprises a refrigerating machine oil containing a hydrocarbon-based base oil, having a viscosity index of 120 or less, and a 1-chloro-3,3,3-trifluoropropene refrigerant. A working fluid composition for a refrigerating machine according to the present embodiment includes an embodiment, which contains a refrigerating machine oil according to the present embodiment and a 1-chloro-3,3,3-trifluoroprop ene refrigerant.

As a hydrocarbon-based base oil, a mineral oil-based hydrocarbon oil, a synthetic hydrocarbon oil, or a mixture thereof may be used.

A mineral oil-based hydrocarbon oil can be obtained by purifying by a method, such as solvent deasphalting, solvent refining, hydrorefining, hydrocracking, solvent dewaxing, hydrodewaxing, clay treatment, and sulfuric acid cleaning, a lubricating oil fraction obtained from a paraffinic, naphthenic or similar crude oil by atmospheric distillation and vacuum distillation. The purification methods may be applied singly or in combinations of two or more.

Examples of a synthetic hydrocarbon oil include an alkylbenzene, an alkylnaphthalene, a poly-α-olefin (PAO), polybutene, and an ethylene-α-olefin copolymer.

As an alkylbenzene, the following alkylbenzene (A) and/or alkylbenzene (B) is preferable from the viewpoint of the long-term reliability of a refrigerating system.

Alkylbenzene (A): An alkylbenzene having 1 to 4 C1 to C19 alkyl groups, wherein the total number of carbon atoms of the alkyl groups is from 9 to 19, (more preferably, an alkylbenzene having 1 to 4 C1 to C15 alkyl groups, wherein the total number of carbon atoms of the alkyl groups is from 9 to 15).

Alkylbenzene (B): An alkylbenzene having 1 to 4 C1 to C40 alkyl groups, wherein the total number of carbon atoms of the alkyl groups is from 20 to 40, (more preferably, an alkylbenzene having 1 to 4 C1 to C30 alkyl groups, wherein the total number of carbon atoms of the alkyl groups is from 20 to 30).

Specific examples of a C1 to C19 alkyl group which an alkylbenzene (A) has include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an eicosyl group. In a case in which the alkyl group has isomers, any of the isomers may be used. Although the alkyl group may be linear or branched, a branched alkyl group is preferable from the viewpoint of stability, viscosity characteristic, and the like, and a branched alkyl group derived from an oligomer of an olefin, such as propylene, butene, and isobutylene, is more preferable particularly from the viewpoint of availability.

Although the number of alkyl groups in an alkylbenzene (A) is from 1 to 4, an alkylbenzene having 1 or 2 alkyl groups, namely a monoalkylbenzene, a dialkylbenzene, or a mixture thereof is used most preferably from the viewpoints of stability and availability.

An alkylbenzene (A) is not limited to an alkylbenzene with a single structure, and may be a mixture of alkylbenzenes with different structures, insofar as each alkylbenzene satisfies the following conditions: it has 1 to 4 C1 to C19 alkyl groups, and the total number of carbon atoms of the alkyl groups is from 9 to 19.

Specific examples of a C1 to C40 alkyl group which an alkylbenzene (B) has include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an icosyl group, a henicosyl group, a docosyl group, a tricosyl group, a tetracosyl group, a pentacosyl group, a hexacosyl group, a heptacosyl group, an octacosyl group, a nonacosyl group, a triacontyl group, a hentriacontyl group, a dotriacontyl group, a tritriacontyl group, a tetratriacontyl group, a pentatriacontyl group, a hexatriacontyl group, a heptatriacontyl group, an octatriacontyl group, a nonatriacontyl group, and a tetracontyl group. In a case in which the alkyl group has isomers, any isomer may be used. Although the alkyl group may be linear or branched, a branched alkyl group is preferable from the viewpoints of stability, viscosity characteristic, and the like, and a branched alkyl group derived from an oligomer of an olefin, such as propylene, butene, and isobutylene, is more preferable particularly from the viewpoint of availability.

Although the number of alkyl groups in an alkylbenzene (B) is from 1 to 4, an alkylbenzene having 1 or 2 alkyl groups, namely a monoalkylbenzene, a dialkylbenzene, or a mixture thereof is used most preferably from the viewpoints of stability and availability.

An alkylbenzene (B) is not limited to an alkylbenzene with a single structure, and may be a mixture of alkylbenzenes with different structures, insofar as each alkylbenzene satisfies the following conditions: it has 1 to 4 C1 to C40 alkyl groups, and the total number of carbon atoms of the alkyl groups is from 20 to 40.

A method for producing an alkylbenzene is optional and there is no particular restriction, and generally the following synthesis method may be applied.

As an aromatic compound to be used as a source material, specifically, for example, benzene, toluene, xylene, ethylbenzene, ethyl methyl benzene, diethylbenzene, and a mixture thereof are used. As an alkylating agent, specifically, for example, a lower monoolefin, such as ethylene, propylene, butene, and isobutylene; a linear or branched C6 to C40 olefin, obtained preferably by polymerization of propylene; a linear or branched C6 to C40 olefin, obtained by thermal cracking of wax, heavy oil, petroleum fraction, polyethylene, polypropylene, and the like; a linear C6 to C40 olefin, obtained by catalytic olefination of n-paraffin separated from a petroleum fraction, such as kerosene, and gas oil; and a mixture thereof may be used.

As an alkylation catalyst for alkylation, publicly known catalysts including a Friedel-Crafts catalyst, such as aluminum chloride, and zinc chloride; and an acidic catalyst, such as sulfuric acid, phosphoric acid, silicotungstic acid, hydrofluoric acid, and activated clay, may be used.

The viscosity index of a hydrocarbon-based base oil is, from the viewpoint of compatibility with a 1-chloro-3,3,3-trifluoropropene refrigerant, preferably 120 or less, more preferably 115 or less, further preferably 110 or less, especially preferably 105 or less, and most preferably 100 or less. The viscosity index of a hydrocarbon-based base oil is, from the viewpoint of lubricity, preferably −50 or more, more preferably −40 or more, and further preferably −30 or more.

The kinematic viscosity of a hydrocarbon-based base oil at 40° C. is preferably 1 $mm^2/s$ or more, more preferably 10 $mm^2/s$ or more, and further preferably 20 $mm^2/s$ or more; and preferably 500 $mm^2/s$ or less, more preferably 120 $mm^2/s$ or less, and further preferably 80 $mm^2/s$ or less. The kinematic viscosity of a hydrocarbon-based base oil at 100° C. is preferably 1 $mm^2/s$ or more, more preferably 2 $mm^2/s$ or more, and further preferably 5 $mm^2/s$ or more; and preferably 30 $mm^2/s$ or less, more preferably 12 $mm^2/s$ or less, and further preferably 10 $mm^2/s$ or less. It is preferable that the kinematic viscosity of a hydrocarbon-based base oil be within the above range because the lubricity can be maintained.

A kinematic viscosity and a viscosity index at 40° C. and 100° C. as used herein means values measured according to JIS K2283: 2000 "Crude petroleum and petroleum products- Determination of kinematic viscosity and calculation of viscosity index from kinematic viscosity", respectively.

The % $C_P$ of a hydrocarbon-based base oil is, from the viewpoints of the stability and lubricity of a refrigerating machine oil, preferably 25 or more, more preferably 35 or more, and further preferably 40 or more; and preferably 90 or less, more preferably 70 or less, and further preferably 60 or less.

The % $C_N$ of a hydrocarbon-based base oil is, from the viewpoints of the stability and compatibility of a refrigerating machine oil, preferably 10 or more, more preferably 20 or more, and further preferably 40 or more; and preferably 75 or less, more preferably 70 or less, and further preferably 60 or less.

The % $C_A$ of a hydrocarbon-based base oil is, from the viewpoints of the compatibility and stability of a refrigerating machine oil, preferably 0 or more, more preferably 1 or more, and further preferably 5 or more; and preferably 45 or less, more preferably 30 or less, and further preferably 10 or less.

Under the present invention, % $C_P$, % $C_N$, and % $C_A$ each mean a value measured by a method (n-d-M ring analysis) according to ASTM D3238-95 (2010).

The sulfur content of a hydrocarbon-based base oil is, from the viewpoint of the stability of a refrigerating machine oil, preferably 8000 ppm by mass or less, more preferably 200 ppm by mass or less, and further preferably 20 ppm by mass or less. A sulfur content as used herein means a value measured by an ultraviolet fluorescence method stipulated in JIS K2541-6: 2003 "Crude petroleum and petroleum products-Determination of sulfur content".

The nitrogen content of a hydrocarbon-based base oil is, from the viewpoint of the stability of a refrigerating machine oil, preferably 200 ppm by mass or less, more preferably 100 ppm by mass or less, and further preferably 50 ppm by mass or less. A nitrogen content as used herein means a value measured according to MS K2609: 1998 "Crude petroleum and petroleum products-Determination of nitrogen content".

The content of a hydrocarbon-based base oil is preferably 80 mass % or more based on the total amount of a refrigerating machine oil, more preferably 90 mass % or more, and further preferably 95 mass % or more in order to acquire superior characteristics required for a refrigerating machine oil, such as lubricity, compatibility, thermal and chemical stability, and electrical insulation.

A refrigerating machine oil may, if necessary, contain additionally various additives. Examples of the additives include an acid scavenger, an antioxidant, an extreme-pressure agent, an oiliness agent, an antifoaming agent, a metal deactivator, an antiwear agent, a viscosity index improver, a pour-point depressant, a detergent dispersant, a friction modifier, and a rust inhibitor. The additive content is preferably 5 mass % or less based on the total amount of a refrigerating machine oil, and more preferably 2 mass % or less.

A refrigerating machine oil preferably contains an acid scavenger among the listed additives from the viewpoints of improvement in thermal and chemical stability. Examples of an acid scavenger include an epoxy compound, and a carbodiimide compound.

There is no particular restriction on an epoxy compound, and examples thereof include a glycidyl ether type epoxy compound, a glycidyl ester type epoxy compound, an oxirane compound, an alkyloxirane compound, an alicyclic epoxy compound, an epoxidized fatty acid monoester, and an epoxidized vegetable oil. The epoxy compounds may be used singly or in combinations of two or more.

Examples of a glycidyl ether type epoxy compound include n-butylphenyl glycidyl ether, i-butylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether, decylphenyl glycidyl ether, decyl glycidyl ether, undecyl glycidyl ether, dodecyl glycidyl ether, tridecyl glycidyl ether, tetradecyl glycidyl ether, 2-ethylhexyl glycidyl ether, neopentyl glycol diglycidyl ether, trimethylolpropane triglycidyl ether, pentaerythritol tetraglycidyl ether, 1,6-hexanediol diglycidyl ether, sorbitol polyglycidyl ether, polyalkylene glycol monoglycidyl ether, and polyalkylene glycol diglycidyl ether.

Examples of a glycidyl ester type epoxy compound include glycidyl benzoate, glycidyl neodecanoate, glycidyl-2,2-dimethyl octanoate, glycidyl acrylate, and glycidyl methacrylate.

An alicyclic epoxy compound is a compound having a partial structure represented by the following formula (10), in which carbon atoms constituting an epoxy group are direct constituents of an alicyclic ring.

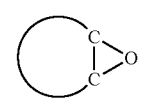

(10)

Examples of an alicyclic epoxy compound include 1,2-epoxycyclohexane, 1,2-epoxycyclopentane, 3',4'-epoxycyclohexyl-methyl-3,4-epoxycyclohexane carboxylate, bis(3,4-epoxycyclohexylmethypadipate, exo-2,3-epoxynorbornane, bis(3,4-epoxy-6-methylcyclohexylmethypadipate, 2-(7-oxabicyclo[4.1.0]hept-3-yl)-spiro(1,3-dioxane-5,3'-[7]oxabicyclo[4.1.0]heptane), 4-(1'-methylepoxyethyl)-1,2-epoxy-2-methylcyclohexane, and 4-epoxyethyl-1,2-epoxycyclohexane.

Examples of an allyloxirane compound include 1,2-epoxystyrene, and alkyl-1,2-epoxystyrene.

Examples of an alkyloxirane compound include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,1,2-epoxyoctadecane, 2-epoxynonadecane, and 1,2-epoxyicosane.

Examples of an epoxidized fatty acid monoester include an ester of an epoxidized C12 to C20 fatty acid with a C1 to C8 alcohol, or phenol or alkyl phenol. As an epoxidized fatty acid monoester, butyl-, hexyl-, benzyl-, cyclohexyl-, methoxyethyl-, octyl-, phenyl- and butylphenyl-esters of epoxystearic acid may be used preferably.

Examples of an epoxidized vegetable oil include an epoxy compound of a vegetable oil, such as a soybean oil, a linseed oil, and a cottonseed oil.

There is no particular restriction on a carbodiimide compound, and, for example, a dialkylcarbodiimide, diphenylcarbodiimide, and a bis(alkylphenyl)carbodiimide may be used. Examples of a dialkylcarbodiimide include diisopropylcarbodiimide, and dicyclohexylcarbodiimide. Examples of a bis(alkylphenyl)-carbodiimide include ditolylcarbodiimide, bis(isopropylphenyl)-carbodiimide, bis(diisopropylphenyl)carbodiimide, bis(triisopropylphenyl)carbodiimide, bis(butylphenyl)carbodiimide, bis(dibutylphenyl)carbodiimide, and bis(nonylphenyl)carbodiimide.

It is preferable that a refrigerating machine oil further contain, among the above additives, an antiwear agent. Examples of a suitable antiwear agent include a phosphoric ester, a thiophosphoric ester, a sulfide compound, and a zinc dialkyldithiophosphate. Among phosphoric esters triphenyl phosphate (TPP), and tricresyl phosphate (TCP) are preferable. Among thiophosphoric esters, triphenylphosphorothionate (TPPT) is preferable. Although there are many sulfide compounds, a monosulfide compound is preferable, because the stability of a refrigerating machine oil can be secured, and deterioration of copper broadly used in a refrigerating machine can be suppressed.

It is preferable that a refrigerating machine oil further contain, among the above additives, an antioxidant. Examples of an antioxidant include phenol compounds such as di-tert-butyl-p-cresol, and amine compounds such as an alkyl diphenyl amine. It is especially preferable that a refrigerating machine oil contain a phenol compound as an antioxidant from 0.02 mass % or more to 0.5 mass % or less based on the total amount of refrigerating machine oil.

It is preferable that a refrigerating machine oil further contain, among the above additives, a friction modifier, an extreme-pressure agent, a rust inhibitor, a metal deactivator, and an antifoaming agent. Examples of a friction modifier include an aliphatic amine, an aliphatic amide, an aliphatic imide, an alcohol, an ester, a phosphoric ester amine salt, and a phosphite ester amine salt. Examples of an extreme-pressure agent include sulfurized olefin, and sulfurized oil. Examples of a rust inhibitor include an ester or partial ester of an alkenyl succinic acid. Examples of a metal deactivator include benzotriazole, and a benzotriazole derivative. Examples of an antifoaming agent include a silicone compound, and a polyester compound.

The content of a base oil in a refrigerating machine oil is preferably 80 mass % or more based on the total amount of a refrigerating machine oil, more preferably 90 mass % or more, and further preferably 95 mass % or more in order to be superior in characteristics required for a refrigerating machine oil, such as lubricity, compatibility, thermal and chemical stability, and electrical insulation.

The viscosity index of a refrigerating machine oil is, from the viewpoint of compatibility with a 1-chloro-3,3,3-trifluoropropene refrigerant, 120 or less, preferably 115 or less, more preferably 110 or less, further preferably 105 or less, and especially preferably 100 or less. The viscosity index of a refrigerating machine oil is, from the viewpoint of lubricity, preferably −50 or more, more preferably −40 or more, and further preferably −30 or more.

The kinematic viscosity of a refrigerating machine oil at 40° C. may be preferably 3 mm$^2$/s or more, more preferably 4 mm$^2$/s or more, and further preferably 5 mm$^2$/s or more; and may be preferably 1000 mm$^2$/s or less, more preferably 500 mm$^2$/s or less, and further preferably 400 mm$^2$/s or less. The kinematic viscosity of a refrigerating machine oil at 100° C. may be preferably 1 mm$^2$/s or more, and more preferably 2 mm$^2$/s or more; and may be preferably 100 mm$^2$/s or less, and more preferably 50 mm$^2$/s or less.

Although there is no particular restriction on the volume resistivity of a refrigerating machine oil, it may be preferably 1.0×10$^9$ Ω·m or more, more preferably 1.0×10$^{10}$ Ω·m or more, and most preferably 1.0×10$^{11}$ Ω·m or more. Especially, when a refrigerating machine oil is used in a closed refrigerating machine, a high electrical insulation tends to be required. A volume resistivity as used herein means a value measured at 25° C. according to JIS C2101: 1999 "Testing methods of electrical insulating oils".

Although there is no particular restriction on the moisture content of a refrigerating machine oil, it may be preferably 1000 ppm or less based on the total amount of a refrigerating machine oil, more preferably 300 ppm or less, and most preferably 100 ppm or less. Especially, when a refrigerating machine oil is used in a closed refrigerating machine, a low moisture content is required from the viewpoints of the thermal and chemical stability of a refrigerating machine oil, or influence on electrical insulation.

Although there is no particular restriction on the acid value of a refrigerating machine oil, it may be preferably 1.0 mg KOH/g or less, more preferably 0.5 mg KOH/g or less, and most preferably 0.1 mg KOH/g or less in order to prevent corrosion of a metal used for a refrigerating machine or piping, and to prevent degradation of an ester in a case where an ester is contained in a refrigerating machine oil. An acid value as used herein means an acid value measured according to JIS K2501: 2003 "Petroleum products and lubricants-Determination of neutralization number".

Although there is no particular restriction on the ash content of a refrigerating machine oil, it may be preferably 100 ppm or less, and more preferably 50 ppm or less for the sake of enhancement of thermal and chemical stability of a refrigerating machine oil according to the present embodiment, and suppression of generation of sludge, and the like. In this regard, an ash content as used herein means an ash content measured according to JIS K2272: 1998 "Crude oil and petroleum products-Determination of ash and sulfated ash".

The pour point of a refrigerating machine oil may be preferably 10° C. or less, more preferably 0° C. or less, and further preferably −10° C. or less. A pour point as used herein means a pour point measured according to JIS K2269.

A composition containing the hydrocarbon-based base oil, and a composition containing the hydrocarbon-based base oil and the various additives, and having a viscosity index of 120 or less may be used favorably as a component of a refrigerating machine oil used with a 1-chloro-3,3,3-trifluoropropene refrigerant, or as a component of a working fluid composition for a refrigerating machine containing the refrigerating machine oil and the 1-chloro-3,3,3-trifluoropropene refrigerant.

A composition containing the hydrocarbon-based base oil, and a composition containing the hydrocarbon-based base oil and the various additives, and having a viscosity index of 120 or less are favorably utilized for manufacturing a refrigerating machine oil to be used together with a 1-chloro-3,3,3-trifluoropropene refrigerant, or for manufacturing a working fluid composition for a refrigerating machine containing the refrigerating machine oil and a 1-chloro-3,3,3-trifluoropropene refrigerant.

A refrigerating machine oil is used together with a 1-chloro-3,3,3-trifluoropropene (1233zd) refrigerant. A working fluid composition for a refrigerating machine contains a 1-chloro-3,3,3-trifluoropropene (1233zd) refrigerant. The 1-chloro-3,3,3-trifluoropropene (1233zd) may be any of cis-1-chloro-3,3,3-trifluoropropene (1233 zd(Z)), trans-1-chloro-3,3,3-trifluoropropene (1233zd(E)), and a mixture thereof.

A refrigerant to be used with a refrigerating machine oil, and a refrigerant that a working fluid composition for a refrigerating machine contains, may further contain a publicly known refrigerant, such as a saturated fluorohydrocarbon refrigerant, and an unsaturated fluorohydrocarbon refrigerant, in addition to 1-chloro-3,3,3-trifluoropropene (1233 zd). The content of 1-chloro-3,3,3-trifluoropropene (1233zd) is preferably 90 mass % or less based on the total amount of a refrigerant, more preferably 60 mass % or less, further preferably 50 mass % or less, especially preferably 40 mass % or less, and most preferably 20 mass % or less from the viewpoint of the stability of a refrigerating machine oil in an atmosphere of a refrigerant. The content of 1-chloro-3,3,3-trifluoropropene (1233zd) is preferably 20 mass % or more based on the total amount of a refrigerant, more preferably 40 mass % or more, further preferably 50 mass % or more, especially preferably 60 mass % or more, and most preferably 90 mass % or more from the viewpoint of reduction of GWP.

Examples of a saturated fluorohydrocarbon refrigerant include any one or a mixture of two or more selected from the group consisting of difluoromethane (HFC-32), pentafluoroethane (HFC-125), 1,1,2,2-tetrafluoro ethane (HFC-134), 1,1,1,2-tetrafluoroethane (HFC-134a), 1,1-difluoroethane (HFC-152a), fluoroethane (HFC-161), 1,1,1,2,3,3,3-heptafluoropropane (HFC-227ea), 1,1,1,2,3,3-hexafluoropropane (HFC-236 ea), 1,1,1,3,3,3-hexafluoropropane (HFC-236fa), 1,1,1,3,3-pentafluoropropane (HFC-245fa), and 1,1,1,3,3-pentafluorobutane (HFC-365mfc). Among them difluoromethane (HFC-32), and 1,1,1,2-tetrafluoroethane (HFC-134a) are preferable from the viewpoints of the stability of a refrigerating machine oil in an atmosphere of a refrigerant and reduction of GWP.

Examples of an unsaturated fluorohydrocarbon refrigerant include any one or a mixture of two or more selected from the group consisting of 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye), and 3,3,3-trifluoropropene (HFO-1243zf). Among them 2,3,3,3-tetrafluoropropene (HFO-1234yf) is preferable from the viewpoints of the stability of a refrigerating machine oil in an atmosphere of a refrigerant and reduction of GWP.

Although there is no particular restriction on the content of a refrigerating machine oil in a working fluid composition for a refrigerating machine, it may be preferably 1 part by mass or more based on 100 parts by mass of a refrigerant, and more preferably 2 parts by mass or more; and may be preferably 500 parts by mass or less, and more preferably 400 parts by mass or less.

A working fluid composition for a refrigerating machine, and a refrigerating machine oil are used advantageously in a room air-conditioner, a refrigerator, or an open- or closed type car air-conditioner provided with a reciprocal or rotary closed type compressor. A working fluid composition for a refrigerating machine, and a refrigerating machine oil are used advantageously in a cooling device, and the like such as a dehumidifier, a water heater, a freezer, a refrigerator/freezer storehouse, an automatic vending machine, a showcase, and a chemical plant. A working fluid composition for a refrigerating machine, and a refrigerating machine oil are also used advantageously in a device provided with a centrifugal compressor.

EXAMPLES

The present invention will be described below more specifically by way of Examples, provided that the present invention be not limited to the following Examples.

As base oils 1 to 10 the following hydrocarbon oils were provided. The properties of the base oils 1 to 10 are shown in Table 1 or 2.

Base oil 1: A base oil obtained through purification by hydrorefining of a furfural extract of a vacuum distillate oil from a naphthene crude oil.
Base oil 2: A base oil obtained through purification by furfural extraction of a vacuum distillate oil from a paraffin crude oil.
Base oil 3: A base oil obtained through purification by hydrorcracking of a furfural extract of a vacuum distillate oil from a naphthene crude oil.
Base oil 4: A base oil obtained through purification by hydrocracking of a furfural extract of a vacuum distillate oil from a paraffin crude oil.
Base oil 5: A branched alkylbenzene A.
Base oil 6: A branched alkylbenzene B.
Base oil 7: A linear alkylbenzene.
Base oil 8: A base oil obtained by hydrocracking and an isomerization treatment of a petroleum wax
Base oil 9: Poly-α-olefin.
Base oil 10: A base oil obtained through purification by hydrorefining of a furfural extract of a vacuum distillate oil from a paraffin crude oil.

TABLE 1

|  | Base oil 1 | Base oil 2 | Base oil 3 | Base oil 4 | Base oil 5 |
|---|---|---|---|---|---|
| 40° C. Kinematic viscosity (mm$^2$/s) | 58.4 | 94.8 | 52.7 | 8.1 | 23.9 |
| 100° C. Kinematic viscosity (mm$^2$/s) | 6.1 | 10.8 | 5.8 | 24 | 3.8 |
| Viscosity index | 6 | 98 | 6 | 116 | −23 |
| % $C_P$ | 45 | 68 | 37 | 80 | 63 |
| % $C_N$ | 45 | 26 | 51 | 19 | 19 |
| % $C_A$ | 10 | 6 | 12 | 1 | 18 |
| Sulfur content (ppm by mass) | 10 | 8000 | 160 | 0 | 0 |
| Nitrogen content (ppm by mass) | 22 | 100 | 40 | 0 | 0 |

TABLE 2

|  | Base oil 6 | Base oil 7 | Base oil 8 | Base oil 9 | Base oil 10 |
|---|---|---|---|---|---|
| 40° C. Kinematic viscosity (mm$^2$/s) | 60.8 | 24.5 | 16.1 | 106.0 | 46.7 |
| 100° C. Kinematic viscosity (mm$^2$/s) | 5.9 | 4.3 | 3.9 | 14.7 | 7.6 |
| Viscosity index | −24 | 58 | 142 | 143 | 129 |
| % $C_P$ | 75 | 64 | 92 | 91 | 80 |
| % $C_N$ | 13 | 22 | 8 | 8 | 20 |
| % $C_A$ | 12 | 14 | 0 | 1 | 0 |
| Sulfur content (ppm by mass) | 0 | 0 | 10 | 10 | 0 |
| Nitrogen content (ppm by mass) | 0 | 0 | 10 | 10 | 0 |

Refrigerating machine oils with a composition shown in Table 3 or 4 were prepared using the base oils 1 to 10 and the following additives.

Additive 1: glycidyl neodecanoate
Additive 2: triphenyl phosphorothioate
Additive 3: tricresyl phosphate
Additive 4: 2,6-di-tert-butyl-p-cresol For each refrigerating machine oil the following refrigerant compatibility test was conducted. The results are shown in Tables 3 and 4.

(Refrigerant Compatibility Test)

According to "Test method for compatibility with refrigerant" in JIS K2211:2009 "Refrigerating machine oils", 10 g of a refrigerating machine oil was blended with 10 g of a trans-1-chloro-3,3,3-trifluoropropene (1233 zd(E)) refrigerant, and the blend was observed to find whether the refrigerant and the refrigerating machine oil were mutually dissolved at 0° C. A case in which a refrigerant and a refrigerating machine oil are mutually dissolved at −10° C. is denoted in the tables as "compatible", and a case in which they are separated is denoted as "separated".

TABLE 3

|  |  | Example 1 | Example 2 | Example 3 | Example 4 | Example 5 | Example 6 | Example 7 |
|---|---|---|---|---|---|---|---|---|
| Composition (mass %, based on total amount of refrigerating machine oil) | Base oil 1 | 100 | — | — | — | — | — | — |
|  | Base oil 2 | — | 100 | — | — | — | — | — |
|  | Base oil 3 | — | — | 100 | — | — | — | — |
|  | Base oil 4 | — | — | — | 100 | — | — | — |
|  | Base oil 5 | — | — | — | — | 100 | — | — |
|  | Base oil 6 | — | — | — | — | — | 100 | — |
|  | Base oil 7 | — | — | — | — | — | — | 100 |
|  | Base oil 8 | — | — | — | — | — | — | — |
|  | Base oil 9 | — | — | — | — | — | — | — |
|  | Base oil 10 | — | — | — | — | — | — | — |
|  | Additive 1 | — | — | — | — | — | — | — |
|  | Additive 2 | — | — | — | — | — | — | — |
|  | Additive 3 | — | — | — | — | — | — | — |
|  | Additive 4 | — | — | — | — | — | — | — |
| Compatibility |  | Compatible | Compatible | Compatible | Compatible | Compatible | Compatible | Compatible |

TABLE 4

|  |  | Example 8 | Example 9 | Example 10 | Comparative Example 1 | Comparative Example 2 | Comparative Example 3 |
|---|---|---|---|---|---|---|---|
| Composition (mass %, based on total amount of refrigerating machine oil) | Base oil 1 | 98.6 | — | — | — | — | — |
|  | Base oil 2 | — | 98.5 | — | — | — | — |
|  | Base oil 3 | — | — | — | — | — | — |
|  | Base oil 4 | — | — | — | — | — | — |
|  | Base oil 5 | — | — | — | — | — | — |
|  | Base oil 6 | — | — | — | — | — | — |
|  | Base oil 7 | — | — | 99.4 | — | — | — |
|  | Base oil 8 | — | — | — | 100 | — | — |
|  | Base oil 9 | — | — | — | — | 100 | — |
|  | Base oil 10 | — | — | — | — | — | 100 |
|  | Additive 1 | 0.5 | 1.0 | 0.3 | — | — | — |
|  | Additive 2 | 0.3 | — | — | — | — | — |
|  | Additive 3 | 0.3 | 0.5 | 0.1 | — | — | — |
|  | Additive 4 | 0.3 | — | 0.2 | — | — | — |
| Compatibility |  | Compatible | Compatible | Compatible | Separated | Separated | Separated |

The invention claimed is:

1. A working fluid composition for a refrigerating machine, comprising:
   a refrigerating machine oil comprising a hydrocarbon-based base oil, the refrigerating machine oil having a viscosity index of 120 or less, and a 1-chloro-3,3,3-trifluoropropene refrigerant, wherein
   the content of the hydrocarbon-based base oil is 80 mass % or more based on the total amount of the refrigerating machine oil;
   wherein a % $C_P$ of the hydrocarbon-based base oil is 63 or more and 90 or less.

2. The working fluid composition for a refrigerating machine according to claim 1, wherein the hydrocarbon-based base oil has a viscosity index of 120 or less.

3. The working fluid composition for a refrigerating machine according to claim 1, wherein the hydrocarbon-based base oil has a % $C_N$ of 10 or more and 75 or less.

4. The working fluid composition for a refrigerating machine according to claim 1, wherein the 1-chloro-3,3,3-trifluoropropene refrigerant is a trans-1-chloro-3,3,3-trifluoropropene refrigerant.

5. The working fluid composition for a refrigerating machine according to claim 1, wherein the % $C_A$ of the hydrocarbon-based base oil is 10 or less.

6. The working fluid composition for a refrigerating machine according to claim 1, wherein the hydrocarbon-based base oil is obtained from a paraffinic crude oil.

7. The working fluid composition for a refrigerating machine according to claim 1, wherein the % $C_P$ is 80 or less.

8. The working fluid composition for a refrigerating machine according to claim 1, wherein the refrigerating machine oil has a viscosity index of 58 to 120.

* * * * *